3,073,857
METHOD OF PREPARING PHOSPHOROTETRATHIOATE ESTERS
Allen F. Millikan, Crystal Lake, and Gifford W. Crosby, River Forest, Ill., assignors to The Pure Oil Company, Chicago, Ill., a corporation of Ohio
No Drawing. Filed Dec. 28, 1959, Ser. No. 862,077
11 Claims. (Cl. 260—461)

This invention relates to a new method of preparing substantially neutral phosphorotetrathioate compounds and to improved lubricant compositions containing a small amount of the phosphorotetrathioate compounds, sufficient to enhance the antiwear properties thereof The reaction of an alcohol or phenol and phosphorus pentasulfide is well known. Diesters of phosphorodithioic acids are commonly prepared by the reaction of 4 mols of the alcohol or phenol with 1 mol of the phosphorus pentasulfide. The products of this reaction may be represented by the formula: $(RO)_2P(S)SH$ where R may be alkyl, aryl, alkaryl or aralkyl groups. In accordance with this invention, we have found that certain alcohols can be reacted with phosphorus pentasulfide to form phosphorotetrathioates. One feature of this invention is the discovery that phosphorotetrathioate esters can be prepared by reacting certain alcohols with phosphorus pentasulfide at elevated temperatures. Another feature of the invention is the discovery that by reacting certain alcohols with phosphorus pentasulfide at moderate temperatures, and for shorter periods of time, diesters of dithioic acids are formed, which on further heating for an additional period of time form the phosphorotetrathioates. We have found that this reaction is confined to secondary alcohols, and is not applicable to primary alcohols. The products of this invention are useful as lubricating-oil additives, pesticides, ore-flotation agents, plasticizers, etc.

Accordingly, it becomes a primary object of this invention to provide a process for preparing esters containing phosphorus and sulfur in sulfur-to-phosphorus ratios of 3 to 5.

Another object of this invention is to provide compositions containing phosphorotetrathioates.

Another object of this invention is to provide lubricating compositions containing phosphorotetrathioates.

A further object of this invention is to provide a process for making phosphorotetrathioates by the reaction of secondary alcohols with phosphorus pentasulfide.

Another object of this invention is to provide a process for making mixtures of phosphorotetrathioates by the reaction of secondary alcohols with phosphorus pentasulfide as elevated temperatures.

Another object of this invention is to provide a process for making phosphorotetrathioates by the reaction of secondary alcohols with phosphorus pentasulfide under conditions to form the dithioate ester, and further reacting the dithioate ester with itself to form mixed phosphorotetrathioate esters.

These and further objects of the invention will be described or become apparent as the specification proceeds.

The process of this invention comprises reacting about 4 mols of a particular secondary alcohol with about 1 mol of phosphorus pentasulfide at an elevated temperature of about 50° to 200° C. for a period of time ranging from about 1 to 10 hours. The process may also be carried out by reacting about 4 mols of a secondary alcohol with about 1 mol of phosphorus pentasulfide under conditions to form the dithioate esters, and further reacting the dithoate esters at a temperature of about 50° to 200° C. for a period of about 1 to 5 hours to form the phosphorotetrathioate esters. The second step of the process can be carried out by allowing the dithioate ester from the first step to stand at room temperature for long periods of time. The diester dithioate intermediate product may or may not be separated from the remaining reaction products or reactants prior to the second heating step.

The alcohols used as starting materials for this reaction have the formula:

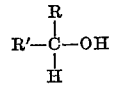

wherein R and R' may be saturated alkyl or alicyclic radicals, aryl, alkaryl, or aralkyl radicals, in which the alkyl or alicyclic radicals each contain from 1 to 16 carbon atoms and the aryl radicals each contain from 6 to 14 carbon atoms in the aryl portion and the aliphatic or alicyclic substituents each contain from 1 to 8 carbon atoms, or in which R or R' are connected to form an alicyclic ring of as many as 20 carbon atoms, and the aralkyl radicals each contain from 1 to 8 carbon atoms in the aliphatic or alicyclic portion and each aryl substituent contains from 6 to 14 carbon atoms.

As seen from the foregoing definitions, the alcohol used as a reactant includes aliphatic monohydric secondary alcohols, but does not include primary or tertiary alcohols. Furthermore, the invention encompasses aromatic alcohols and alcohols containing mixed groups, e.g., both alkyl groups and aryl groups, both alkyl and alkaryl groups, both alkyl and aralkyl groups, both aryl and alkaryl groups, both aryl and aralkyl groups, or both alkaryl and aralkyl groups.

Examples of alcohols coming under this definition wherein both R' and R'' are alkyl groups include the following second alcohols: isopropyl alcohol, sec-butyl alcohol, methylpropylcarbinol (pentanol-2), diethylcarbinol (pentanol-3), methlisopropylcarbinol, hexanol-2, hexanol-3, 3-methylpentanol-2, methylisobutylcarbinol (4-methyl-2 pentanol), ethylisopropylcarbinol, pinacolyl alcohol, diisopropylcarbinol, capryl alcohol, and isopropyl-tert-butylcarbinol.

Alicyclic alcohols coming within the scope of the invention where R and/or R' are alicyclic radicals include cyclobutanol, cyclopentanol, cyclohexanol, cycloheptanol, cyclopentadecanol, cyclohexadecanol, cycloheptadecanol, borneol, and fenchyl alcohol. Aromatic alcohols include benzhydrol, phenylmethylcarbinol, hexylphenyl carbinol, dinaphthyl carbinol, phenylethylcarbinol, phenylbutylcarbinol, di(4-ethylphenyl)carbinol, di-tolylcarbinol, phenylisopropylcarbinol, naphthylethylcarbinol, anthrylmethylcarbinol and naphthylbutylcarbinol.

The invention is illustrated by the following experimental examples:

*Example 1.*—A reaction mixture consisting of 260 g. (2.0 moles) of capryl alcohol (2-octyl alcohol), 111 g. (0.5 mole) of phosphorus pentasulfide, 261 g. of 85 vis., 100 V.I. neutral oil, and 300 ml. of toluene was charged to a 2-liter reaction flask fitted with a mechanical stirrer. The reaction mixture was stirred for six hours at 90° C., at the end of which time 808 g. of product were recovered. The theoretical analysis for a 43% solution of O,O'-dicapryl phosphorodithioic acid is: 3.8%; S, 7.8%; acid number 68. We found: P, 3.8%; S, 7.8%; acid number 62.

The foregoing product was stored for 37 months at room temperature, at the end of which time it was observed that separation into two phases had occurred. The upper phase had an acid number of only 19.6, a phosphorus content of 1.8% w., and a sulfur content of 7.7% w., indicating that the phosphorotetrathioate had formed. The low acidity of the tetrathioate can be reduced to substantially zero by adequately washing the product with water. The lower phase, which was much smaller in volume, had a very high acidity.

The antiwear properties of the tetrathioate product were demonstrated, by engine tests of the "MS sequence IV" type, on a De Soto engine. The product was stripped free of toluene, and an amount sufficient to achieve a phosphorus content of 0.07% w. was incorporated into a straight-run, Mid-Continent neutral oil having a viscosity of 200 SUS at 100° F., and containing 4% w. of a commercial basic barium sulfonate detergent. The twenty-four hour test period of cyclic operation at no-load running and rest was completed with no distress appearing on any of the tappet faces or cam lobes. A reference blend, in which the tetrathioate was omitted, failed the MS IV test, with distress appearing on six tappets.

*Example 2.*—This invention was demonstrated further by reacting 4-methyl-2-pentanol ("methylamyl alcohol"), and also by reacting commercial grade sec-amyl alcohol, with phosphorus pentasulfide at about the same conditions used in Example 1. Analyses of the products immediately after preparation, and after storage for about three years, were as follows:

*Example 3.*—A reaction mixture comprising about 4.0 mols of methylpropylcarbinol (pentanol-2), 1.0 mol of phosphorus pentasulfide, 300 g. of 85 vis., 100 V.I. neutral oil, and 300 ml. of benzene are charged to a 2-liter reaction flask fitted with a mechanical stirrer and reacted at 100° C. for about 7 hours. At the end of this time, the reaction mass is allowed to cool and is stored at room temperature for about 30 days. At the end of this time two phases are separated. The upper phase is essentially an oil-soluble di-2-pentyl phosphoretrathioate, having an acid number of about 20, a phosphorus content of about 2.0 wt. percent, and a sulfur content of about 8.0 wt. percent The lower phase of much smaller volume is of high acidity and contains about two acid equivalents per atom of phosphorus.

*Example 4.*—The procedure outlined in Example 1 is repeated using borneol, and the tribornyl ester of phosphorotetrathioic acid is separated as the upper phase.

*Example 5.*—The procedure outlined in Example 1 is repeated using phenylbutylcarbinol and the tri(di-2-phenylamyl) ester of phosphorotetrathioic acid is separated as the upper phase.

*Example 6.*—O,O' di-4-methyl-2-pentyl phosphorodithioic acid was freshly prepared in the manner of Exam-

| Parent Alcohol | Percent Phosphorus | | Percent Sulfur | | S/P Ratio | | Acid Number | | Acid Equiv./P Atom | |
|---|---|---|---|---|---|---|---|---|---|---|
| | Before | After [1] | Before | After [1] | Before | After [1] | Before | After [1] | Before | After [1] |
| 4-methyl-2-amyl alcohol | 4.4 | 2.4 | 8.5 | 8.7 | 1.9 | 3.5 | 59 | 10.7 | 0.7 | 0.2 |
| Commercial sec-amyl alcohol | 6.5 | 2.6 | 11.9 | 10.8 | 1.8 | 4.0 | 95 | 12.3 | 0.8 | 0.3 |

[1] All "after" analyses are on upper-phase material, after its separation upon storage. It is apparent that the sulfur content of the upper phase remained substantially constant, while the phosphorus content decreased by about 50% over the three-year period, indicating that at least partial conversion of the diester of dithioic acid to the tetrathioate had occurred.

It is seen that the present invention is based on the discovery that while alcohols and phenols in general react with phosphorus pentasulfide to form esters of phosphorodithioic acids, the reaction with secondary alcohols, in which the carbon atom attached to the hydroxyl group is attached to at least two other carbon atoms, may be anomalous. When a secondary alcohol and phosphorus pentasulfide are reacted in a 4/1 mol ratio, an exothermic reaction takes place which produces a two-phase product. Upon allowing the reaction mixture to stand for a period of time, the phases are separated and the upper (or lighter) phase is recovered as the crude triester of phosphorotetrathioic acid. This product has a high sulfur-to-phosphorus ratio, on the order of 3.0 to 5/1, a low acidity or acid number of the order of 10–30, and is oil soluble. The lower phase separated from the reaction mass has been found to have a much higher acidity, i.e., approximately two acid equivalents per atom of phosphorus. Furthermore, the lower phase has a very small percentage of the sulfur charged as phosphorus pentasulfide, having a sulfur-to-phosphorus ratio of the order of 0.25 or less.

Another feature of the invention as shown by Example 1 is that the upper phase of the reaction product, when incorporated in mineral lubricating oils, exhibits antiwear properties to an unexpected degree. For this purpose, a small amount of the reaction product of this invention is used to impart substantial antiwear properties to the lubricating oils, e.g., an amount providing a phosphorus concentration of about 0.005 to 1.0% by weight. Because of the content of sulfur and phosphorus, the phosphorotetrathioate product of this invention is useful as an insecticide. The chemical stability and density also make the product useful as an oil flotation agent.

The invention is further illustrated by the following examples:

ple 2. A portion of this acid, amounting to 0.057 equivalent was charged to a flask along with approximately ½ volume of toluene. A reflux condenser was mounted over the flask and heat was applied so as to have reflux conditions for one hour. During this period, the pot temperature was maintained at 115° to 125° C. At the end of the period, the product had separated into two phases. The phases were separated and the acidity measured. The following is the acidity balance found:

```
                                              Equivalents
Upper phase _____ 0.010
Lower phase _____ 0.048
Totalling _____ 0.058
Charge _____ 0.057
```

The above distribution of acidity indicates that disproportionation is well advanced after heating for one hour at 120° C. with essentially no overall change in acidity.

Additional antiwear test data was obtained on the four ball E.P. tester. Since the procedure and operation of the four ball E.P. test is well known and described in the literature and various lubrication engineering manuals, there is no necessity for a detailed description herein. These tests were performed using a 170 vis. 100 V.I. neutral oil as the carrier for the underrated products prepared in accordance with this invention. The results are tabulated as follows:

| | Antiwear agent (in such conc. that 0.1% by wt. of phosphorus was present in blend) | Four ball test (5 min., 20 kg., 1,800 r.p.m., wear scar, mm.) |
|---|---|---|
| Test No. 1 | None | 0.38+0.016 |
| Test No. 2 | Product from 4-methyl-2-pentanol (Example 2) | 0.32+0.026 |
| Test No. 3 | Product from sec. amyl alcohol (Example 2) | 0.33+0.024 |

The foregoing tests demonstrate antiwear properties of the blends due to the compounds of this invention.

*Example 7.*—The procedure outlined in Example 2 is repeated using 2-hexadecanol and the tri-2-hexadecyl ester of the phosphorothioic acid is separated as the upper phase after heating for about two hours at a pot temperature of 115° to 125° C.

The invention has been described in relation to several specific embodiments which are given as illustration only and the invention may be practiced otherwise than as specifically described but within the scope of the appended claims.

The embodiments of the invention in which an exclusive property or privilege is claimed are defined as follows:

1. The method of preparing phosphorotetrathioate esters which comprises reacting an alcohol of the formula

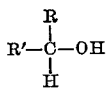

wherein R and R' are hydrocarbon substituents of the group consisting of saturated aliphatic hydrocarbon radicals having 1 to 16 carbon atoms, saturated alicyclic hydrocarbon radicals having 3 to 16 carbon atoms, saturated alicyclic hydrocarbon rings of 3 to 20 carbon atoms formed by the connection of R and R', aryl hydrocarbon radicals having 6 to 14 carbon atoms, alkaryl hydrocarbon radicals having 6 to 14 carbon atoms in the aryl portion thereof and 1 to 8 carbon atoms in the saturated alkyl portion thereof, alicyclic aryl hydrocarbon radicals having 6 to 14 carbon atoms in the aryl portion thereof and 3 to 8 carbon atoms in the saturated alicyclic portion thereof, aralkyl hydrocarbon radicals having 1 to 8 carbon atoms in the saturated alkyl portion thereof and 6 to 14 carbon atoms in the aryl portion thereof and aryl alicyclic hydrocarbon radicals having 3 to 18 carbon atoms in the saturated alicyclic portion thereof and 6 to 14 carbon atoms in the aryl portion thereof, with phosphoruspentasulfide at an elevated temperature sufficient to induce said reaction, allowing said reactants to remain in admixture for a time sufficient to form two liquid phases, and separating the phosphorotetrathioate ester as the upper phase.

2. The method in accordance with claim 1 in which the mole ratio of alcohol to phosphoruspentasulfide is not less than about 4/1, the temperature of the reaction is maintained at between about 50° C. and 200° C. for a time sufficient to form two liquid phases and the corresponding phosphorotetrathioate ester is separated from the upper phase.

3. The method in accordance with claim 1 in which R and R' are aliphatic radicals.

4. The method in accordance with claim 1 in which R and R' are alicyclic radicals.

5. The method in accordance with claim 1 in which R is an aryl radical and R' is an aliphatic radical.

6. The method in accordance with claim 1 in which R is an aryl radical and R' is an alicyclic radical.

7. The method in accordance with claim 1 in which R is an alkaryl radical and R' is an aliphatic radical.

8. The method in accordance with claim 1 in which R is an alkaryl radical and R' is an alicyclic radical.

9. The method in accordance with claim 1 in which R is an alicyclic radical and R' is an alkyl radical.

10. The method in accordance with claim 1 in which the mole ratio of alcohol to phosphorus pentasulfide is not less than 4/1 and the temperature of the reaction is maintained above about 90° C. for about 6 hours, followed by separation of an upper-phase product.

11. The method in accordance with claim 10 in which the reactants are allowed to remain in admixture at about room temperature for a period of at least 30 days before separation of said phases.

References Cited in the file of this patent

UNITED STATES PATENTS

| | | |
|---|---|---|
| 2,500,498 | Reiff et al. | Mar. 14, 1950 |
| 2,531,129 | Hook et al. | Nov. 21, 1950 |
| 2,589,675 | Cook et al. | Mar. 18, 1952 |
| 2,597,534 | Schroder | May 20, 1952 |

OTHER REFERENCES

Kosolapoff: "Organo-Phosphorus Compounds" (1950) John Wiley and Sons, page 260.

Menefee et al.: "J. Org. Chem.," vol. 22, pages 792–795 (1957).

UNITED STATES PATENT OFFICE
CERTIFICATE OF CORRECTION

Patent No. 3,073,857                      January 15, 1963

Allen F. Millikan et al.

It is hereby certified that error appears in the above numbered patent requiring correction and that the said Letters Patent should read as corrected below.

Column 2, line 37, for "methlisopropylcarbinol" read -- methylisopropylcarbinol --; column 2, line 43, for "where" read -- wherein --; column 4, lines 70 to 75, last column of the table, for "+", three occurrences, read -- $\pm$ --; column 4, line 10, for "phosphoretrathioate" read -- phosphorotetrathioate --.

Signed and sealed this 1st day of October 1963.

(SEAL)
Attest:

ERNEST W. SWIDER                      DAVID L. LADD

Attesting Officer                      Commissioner of Patents